Feb. 10, 1953 C. T. GRAUER 2,628,297
SHIELDED SWITCH ASSEMBLY
Filed Sept. 20, 1946
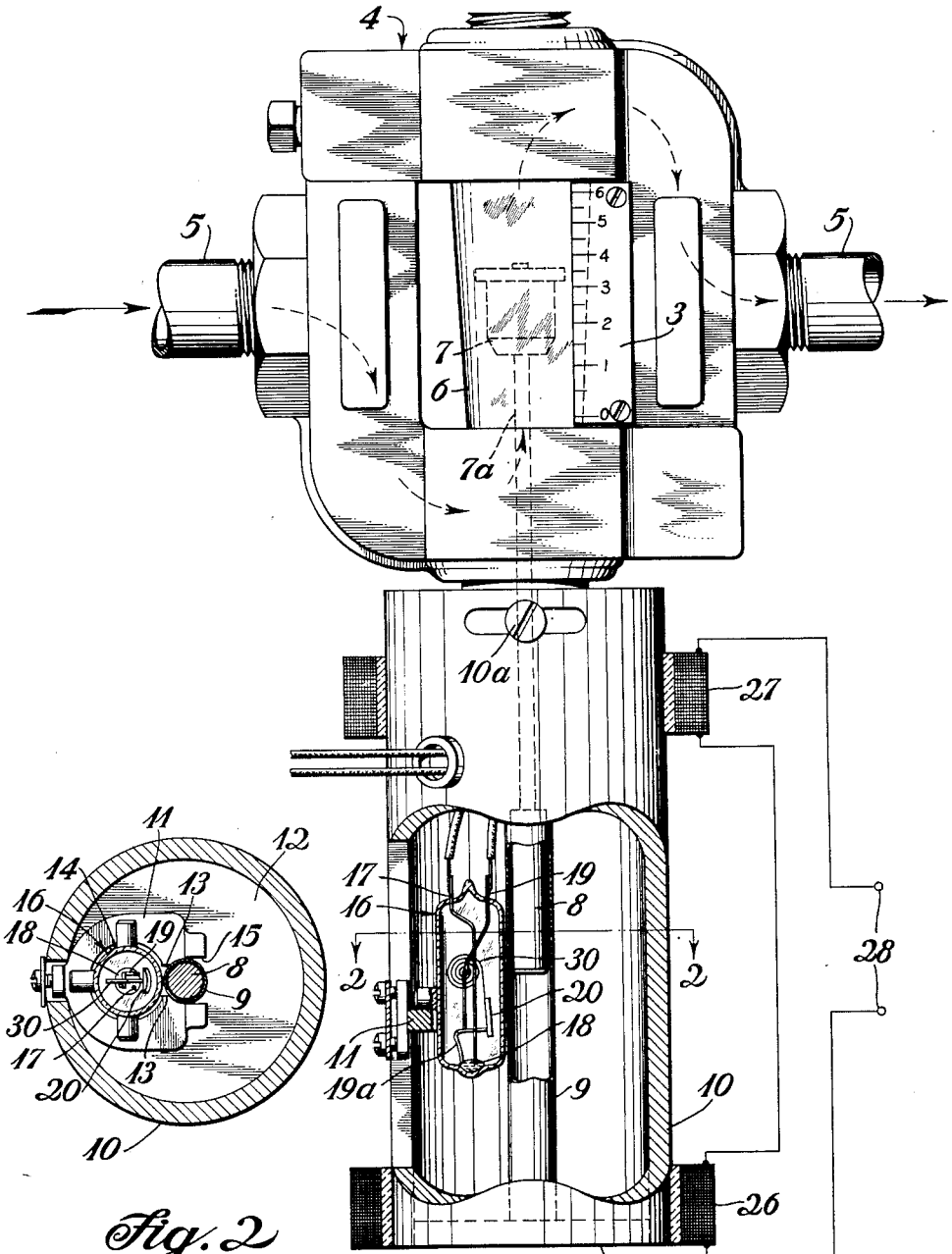
INVENTOR
Carl T. Grauer
BY Robert A. Levender
ATTORNEY Patented Feb. 10, 1953

2,628,297

UNITED STATES PATENT OFFICE 2,628,297

SHIELDED SWITCH ASSEMBLY

Carl T. Grauer, Oakland, Calif., assignor to the United States of America as represented by the United States Atomic Energy Commission Application September 20, 1946, Serial No. 698,371

2 Claims. (Cl. 200—87)

This invention relates to flow switches and more particularly to a magnetically operated flow switch particularly adapted for use in the neighborhood of a strong disturbing magnetic field and in which means is incorporated for neutralizing the effect of this disturbing magnetic field.

While the invention is of general application, it is particularly useful for regulation of the flow of liquids employed in connection with a calutron, which is an electromagnetic device for the separation of isotopes of polyistopoic material and which employs powerful electromagnets setting up magnetic fluxes which may reach the order of 4000 gauss.

It is accordingly an object of this invention to provide an improved magnetically controlled flow switch capable of neutralizing any disturbing magnetic fields in its environment.

It is a further object of this invention to provide a magnetically controlled flow switch which is magnetically shielded from any disturbing magnetic field to which the device may be exposed.

It is a feature of this invention to provide a magnetically controlled flow switch employing a ferromagnetic shield in the region of the magnetic control elements and coils adapted to set up either an alternating magnetic flux or a magnetic flux whose direction is opposed to the direction of the disturbing magnetic field.

Further objects and advantages will be apparent from the annexed specification in which:

Figure 1 is an elevation, partly in section, of a flow switch embodying the present invention; and Fig. 2 is a section taken along the line 2—2 of Fig. 1.

Referring more particularly to the drawings, there is shown a flow switch or rotameter of more or less conventional design but incorporating the magnetic shielding features of this invention. The flow switch includes a metering device indicated generally at 4 connected in a conduit 5, liquid flowing through the conduit and the metering device along the path indicated by the arrows. The numeral 6 indicates a vertically disposed transparent tapering tube through which the liquid passes upwardly. A float 7 is disposed within the tube 6 and assumes a height corresponding to the rate of flow, which rate of flow may be read directly on the scale 3. The float 7 is secured to a rod 7a on the lower end of which is carried a soft iron plunger 8. A tubular member 9, of brass or other nonmagnetic material, surrounds the plunger 8 and communicates with the interior of the metering device 4 so as to permit free movement of the plunger 8 in a vertical direction in accordance with the rate of flow.

A tubular member 10 of soft iron or other ferromagnetic material is secured to the base of the meter 4, as by set screw 10a, concentric with the tubular member 9. The bottom of the member 10 is closed by an end plate 12 of the same material. The members 10 and 12 serve as magnetic shields for the instruments enclosed therein.

A U-shaped permanent magnet 11 is arranged to be set at a predetermined height within the tubular member 10 corresponding to the rate of flow at which the operation of the switch is desired. The permanent magnet has a pair of projecting segments 13 between the main opening 14 of the magnet and the gap 15 formed between the pole tips. A mercury switch 16 is disposed within the opening 14. The tube 9 is disposed between the pole tips of the magnet 11.

The mercury switch 16 comprises a lead 17 which is in permanent contact with a small pool 18 of mercury at the bottom end of the mercury switch. A second lead 19 includes a coil spring 30 biasing a small armature 20 to which is attached a bent wire 19a adapted to be moved into or out of contact with the mercury pool 18. The armature 20 is disposed adjacent the two projecting segments 13 of the magnet 11.

When the conditions of flow are such that the plunger 8 is disposed within the tube 9 exterior to the gap of the magnet 11 a relatively large portion of leakage flux passes through the armature 20, drawing it toward the gap 15 against the action of the spring 30, thus causing the wire 19a to engage the mercury pool 18 and closing the mercury switch. The circuit including the mercury switch 16 may include an alarm to indicate that insufficient fluid is being passed by the meter.

When the plunger 8 enters the gap of the magnet 11, the amount of leakage flux passing through the armature 20 is reduced to a point where the hair spring 30 draws the armature 20 away from the gap 15, thus opening the mercury switch 16.

Mounted on each end of the tubular member 10 is a coil, indicated respectively at 26 and 27, connected in series and leading to suitable sources of potential 28. The coils 26 and 27 may be energized by either direct or alternating current, though direct current is preferred, as care must be taken in the case of alternating current to prevent the demagnetizing of the permanent magnet 11.

When the device above described was utilized in connection with metering fluid to a calutron having a field of approximately 4000 gauss, it was discovered that without energizing the coils 26 and 27, the magnetic field of the calutron disturbed the operation of the meter to a point where it became inoperative, while when a direct current producing 200 ampere turns was passed to the coils in such a direction as to oppose the field of the calutron, the meter became operative even though a wide fluctuation in the field strength of the calutron was permitted. Furthermore, the meter remained operative when the coils were thus energized, even when the calutron field was turned off, the field of the coils 26 and 27 being insufficient alone to prevent operation of the meter but being sufficient to oppose the field of the calutron to a point where the meter became operative.

While there is described what is at present considered a preferred embodiment of the invention, it will be understood that various changes and modifications may be made therein without departing from the spirit of the invention and it is intended to cover all such changes and modifications as come within the true scope and spirit of the appended claims.

What is claimed is:

1. In combination with a rotameter for use in magnetic fields and having a vertical metering tube and a metering float adapted for free up and down movement within said tube, an elongated member connected to said float and extending vertically therefrom beyond said metering tube, a permanent magnet having a gap therein, a soft iron slug disposed at the free end of said elongated member, means for guiding said soft iron slug into and out of said magnet gap, an electrical switch having a magnetically actuated movable contact element disposed proximate to but inwardly of said gap, whereby downward movement of said float moves said slug into said gap changing the magnetic force affecting said element and actuating same, a cylindrical ferromagnetic shield surrounding said magnet, slug and switch and having also a continuous wall extending across the lower end thereof, and a pair of serially connected coils disposed in spaced and surrounding relation about said shield for providing upon energization and with said shield effective neutralization of external magnetic fields.

2. In combination with a rotameter for use in magnetic fields and having a vertical metering tube and a metering float adapted for free up and down movement within said tube, an elongated member connected to said float and extending vertically therefrom beyond said metering tube, a permanent magnet having a gap therein, a soft iron slug disposed at the free end of said elongated member, means for guiding said soft iron slug into and out of said magnet gap, an electrical switch having a magnetically actuated movable contact element disposed proximate to but inwardly of said gap, whereby upon downward movement of said float said slug is moved into said gap changing the magnetic force affecting said element for actuating same, a cylindrical ferromagnetic shield surrounding said magnet, slug and switch and having a longitudinal slot therein for adjustably mounting said magnet and a circumferential slot for accommodating orientation of said shield with respect to said rotameter, screw means extending through said circumferential slot into said rotameter for holding the latter in fixed relation to said shield, a pair of spaced coils encircling said shield and disposed one at each end of the latter, and serial connections for energizing said coils to effect within said shield neutralization of external disturbing magnetic fields.

CARL T. GRAUER.

REFERENCES CITED

The following references are of record in the file of this patent:

UNITED STATES PATENTS

| Number | Name | Date |
|---|---|---|
| 650,915 | Scribner et al. | June 5, 1900 |
| 1,560,778 | Goddard | Nov. 10, 1925 |
| 1,708,936 | Cioffi | Apr. 16, 1929 |
| 2,187,369 | Uehling | Jan. 16, 1940 |
| 2,250,738 | Wittmann | July 29, 1941 |
| 2,419,942 | Brewer | May 6, 1947 |